United States Patent
Knauf

(10) Patent No.: US 6,210,767 B1
(45) Date of Patent: Apr. 3, 2001

(54) RELEASE LINER BASE STOCK FOR PRINTED FILMS OR LABELS

(75) Inventor: Gary H. Knauf, Appleton, WI (US)

(73) Assignee: International Paper Company, New York, NY (US)

( * ) Notice: Subject to any disclaimer, the term of this patent is extended or adjusted under 35 U.S.C. 154(b) by 0 days.

(21) Appl. No.: 08/326,501

(22) Filed: Oct. 20, 1994

(51) Int. Cl.⁷ .................................................. B32B 7/12
(52) U.S. Cl. .................... 428/40.1; 428/352; 428/353; 428/354; 428/343; 428/447; 428/913; 428/78; 428/314.2; 428/41.4; 428/40.6; 428/41.3; 428/41.5
(58) Field of Search ...................... 428/40, 354, 352, 428/353, 343, 447, 289, 913, 78, 314.2, 40.1, 41.4, 40.6, 41.3, 41.5

(56) References Cited

U.S. PATENT DOCUMENTS

| | | | |
|---|---|---|---|
| 2,328,057 | * 8/1943 | Coulter | 428/351 |
| 3,118,534 | * 1/1964 | Groff et al. | 428/352 |
| 3,509,991 | * 5/1970 | Hurst | 428/322.7 |
| 3,896,249 | * 7/1975 | Keeling et al. | 428/202 |
| 4,157,410 | * 6/1979 | McClintock | 428/40 |
| 4,528,055 | * 7/1985 | Hattemer | 156/247 |
| 4,609,589 | * 9/1986 | Hosada et al. | 428/352 |
| 4,783,354 | * 11/1988 | Fagan | 428/40 |
| 4,859,511 | 8/1989 | Patterson et al. | 428/40 |
| 5,154,956 | 10/1992 | Fradrich | 428/40 |

* cited by examiner

Primary Examiner—Elizabeth M. Cole
(74) Attorney, Agent, or Firm—Hoffman, Wasso & Gitler

(57) ABSTRACT

A release liner carrier web including a paper layer, a release layer including a polypropylene layer coated onto the substrate and a silicone release agent coated onto the polypropylene coating layer. The liner further including a second coating layer made up of an acrylic resin type material for sealing the paper substrate and preventing curling and contamination of a label or printed film adhesively laminated thereon.

1 Claim, 1 Drawing Sheet

RELEASE LINER BASE STOCK FOR PRINTED FILMS OR LABELS

BACKGROUND OF THE INVENTION

The invention relates to release liner base stocks which are used as a carrier web to dispense die cut film labels onto glass and plastic bottles. More particularly, there is disclosed a non-curling release liner and base stock which acts as a carrier for printed films and labels. The release liner is wound up and discarded at the end of the labelling process.

The current release liner on the market consists of a substrate material such as an unbleached kraft type paper and extrusion coated thereon a layer of a polymer resin. The polymer layer, which has been coated onto the paper, is then coated with a silicone type material which acts as the release layer for a subsequently attached label or printed film. The release liner and a film sandwich material or label is then sent to a printer, that prints on the film in roll form. The film sandwich material is comprised of a printed film and an adhesive. The final step is for rolls, of the assembled laminate, release liner and printed film sandwich or label, to be die cut and dispensed onto bottles or the like. The die cut is made through the film, the adhesive, and partly into the polymer coating layer. The release liner acts as a carrier for the film labels or printed film sandwich, and is wound up and discarded at the end of the labelling process.

A problem with the existing release liner laminate is that loose fibers from the paper side of the laminate get picked off and contaminate the polymer layer and printed film or label layer surfaces during silicone coating, adhesive laminating, and printing operations. Manufacturing machines used for the process have to be taken out of production to manually clean the paper fiber from coating and printing cylinders.

Another problem with the current release liner laminate is that during the adhesive laminating step, the heat that is supplied to the web causes the liner to curl in the cross machine direction due to shrinkage of the polymer coating. To eliminate this curl, water or steam has been applied to the paper side of the sheet. This application is an expensive and inefficient added step to the process.

One object of the present invention is to reduce the fiber contamination problem by applying a specialized coating to the uncoated side of the paper substrate of the release liner. The specialized coating covers and protects the paper fibers. This coating also significantly reduces the amount of curl in the liner, thereby significantly reducing the amount of steam that needs to be applied to the sheet during the adhesive lamination process.

Another object of the invention is to improve the efficiency of coating, laminating, and printing equipment by significantly reducing fiber pick-off contamination from the uncoated side of the paper substrate of the release liner.

A further object of the present invention is the reduction of cross-directional curl of the liner paper.

SUMMARY OF THE INVENTION

In accordance with one aspect of the invention, the non-curling and uncontaminated liners are made by forming an unique multilayer release liner carrier web comprising, a paper substrate, a polymer coating layer located on the upper side of the paper substrate such as a polypropylene polymer, and a second coating layer such as an acrylic resin, polyvinylidene dichloride or polyvinyl alcohol coated on the lower side of the paper substrate. The upper side of the upper substrate corresponds to the side where the printed film is applied.

The multilayer carrier web is then coated on its upper side (polypropylene side) with a release agent such as silicone.

The release liner, which includes the release liner base stock and silicone release agent coated thereon, is ready for application of a printed film or label thereon through the use of an adhesive transfer agent.

The adhesive is removably affixed to the silicone release agent layer and a printed film or label is applied thereto. The printed film, or label, and adhesive is then removed from the release liner and applied to a glass bottle, or the like, during the labelling process.

BRIEF DESCRIPTION OF THE DRAWINGS

The invention will be better understood from the following detailed description considered in conjunction with the attached drawings in which.

DETAILED DESCRIPTION OF THE INVENTION

The terminology "label or printed film" (face sheet) is used throughout this description to denote all sheet products, regardless of size or configuration, which were designed to be affixed to a glass bottle, plastic bottle, or the like. The term "release liner base stock or carrier web" is used herein to describe an unique sandwich laminate which has a paper substrate, a coating layer such as a polypropylene polymer material extrusion coated or the like on its upper surface and a sealing coating layer such as an acrylic latex polymer resin coated on the paper's lower surface. The term "release liner" is used herein to describe a sandwich laminate which includes a release agent, such as silicone, coated on the extrusion coated surface of polypropylene of the release liner carrier web. The release agent permits a transfer adhesive agent to be attached to the release liner base stock or carrier web. This transfer adhesive has placed thereon a printed film or label and transfers from the release liner to the back of the label for subsequent affixation to glass bottles or the like.

Figure 1:
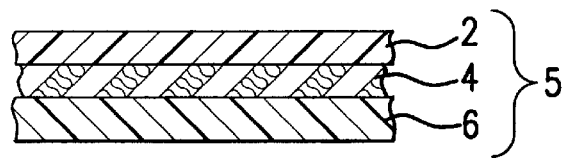
FIG. 1 is a cross-sectional view, greatly enlarged, of one embodiment of the non-curling release liner carrier web of the invention.

FIG. 1 shows a release liner base stock or carrier web of the invention, generally designated by reference numeral 5. The release liner carrier web includes a sheet of paper 4 having a coating 2 on its upper surface and a protective sealing coating 6 on its lower surface.

Coating layer 2 which is preferably applied by extrusion coating techniques, can be a polypropylene homopolymer, a polypropylene copolymer, or a low density polyethylenepolypropylene blended polymer resin. This coating can be placed on either side of an untreated paper and is preferably coated to a machine glazed side to maximize coating smoothness. A minimum coating weight of approximately 7 lbs/3MSF is preferable. Lower coating weights will produce excessive pinholes and poor adhesion to the base paper. If desired, corona discharge treatment and liquid polymers could be added to enhance the adhesion of the polypropylene type material coating to the paper.

Paper substrate layer 4 may be made from any fiber cellulose material in sheet form, but is preferably made from kraft paper. The paper can be bleached or unbleached and can be, if desired, machine glazed or machine finished. One of the principal purposes of sheet 4 is to provide a structural layer for the release liner carrier web, and release liner. Once the printed film or label is applied, the layer acts as a structural support for the entire composite. Accordingly, layer 4 is preferably a paper which is machine glazed and has a caliper thickness ranging from 2.9 mils to about 3.5 mils after the paper has been coated with the polypropylene based material and the protective sealing polymer layer 6.

The sealing coating layer 6 is applied to the underside or bottom of the paper and can be applied either to the rough or smooth side of the paper layer.

The sealing coating formulation is preferably a water-based acrylic latex polymer material that hardens to prevent the surface fibers from the paper from being easily removed therefrom. The water-based acrylic latex formulation coating preferably comprises water, an acrylic polymer latex resin, such as HIGHCAR 26348 sold by B.F. Goodrich Corporation and a defoamer which is a group of surfactants such as that sold by Witco as Bubble Breaker 748. Any suitable acrylic latex polymer resin would accomplish the preferred task as would any suitable defoaming material.

Further, one could utilize in place of the water-based acrylic latex polymer resin a polyvinylidene dichloride, or polyvinyl alcohol as the sealing coating layer.

The coating must completely cover the surface fibers and have a coating weight preferably ranging from 0.5 lbs/3MSF to 5 lbs/3MSF.

The unique release liner base stock or carrier web resists curling and prevents paper fibers from contaminating a subsequently applied silicone release agent layer and the resultant printed film or label applied thereto.

The steaming or washing step, required in the past, is significantly reduced.

Figure 2:
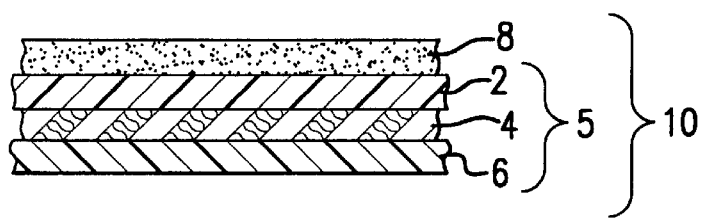
FIG. 2 is a cross-sectional view, greatly enlarged, of one embodiment of the non-curling release liner of the invention.

FIG. 2 illustrates a release liner base stock 5, as described above, having a silicone release agent layer 8 coated thereon to form an unique release liner 10. Release agent 8 serves the function of providing an unique surface for application thereon of a transfer adhesive which will allow a printed film or label to be placed thereon for subsequent removal. The release agent permits the adhesive to be placed thereon in a light fashion but prevents the adhesive from sticking fast to the release liner composite 10. The specific release agent used on the release liner carrier web is preferably a silicone material. A number of commercial curable silicones are available for this purpose, including SYL-OFF 23, a curable silicone rubber polymer manufactured by Dow Corning Company, and radiation curable type RC-450 silicone, sold by Goldschmidt Company.

Figure 3:
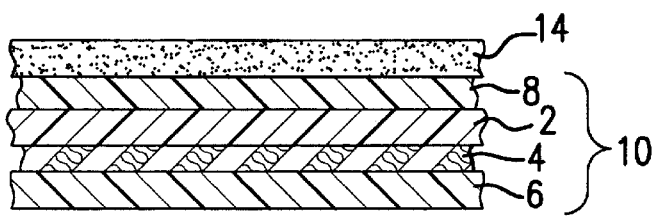
FIG. 3 is a cross-sectional view, greatly enlarged, of one embodiment of the non-curling release liner with transfer adhesive agent applied thereon.

FIG. 3 illustrates a release liner composite 10 as shown in FIG. 2 and described above in combination with a transfer adhesive 14 applied thereon.

Adhesive 14 is preferably a moisture impermeable pressure sensitive adhesive. As noted, when the label or printed film is attached to the release liner 10, adhesive 14 transfers to the printed film for subsequent application to a glass bottle or the like.

Figure 4:
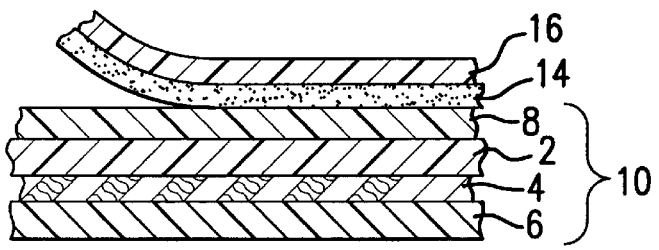
FIG. 4 is a cross-sectional view, greatly enlarged, of one embodiment of the non-curling printed film or label and transfer agent with release liner of the invention showing the printed film or label and adhesive being pulled away from the release liner.

FIG. 4 illustrates a printed film or label 16 with a transfer adhesive 14 being removed from the release liner 10. The printed film or label 16 may be made from any moisture insensitive material such as treated paper or a polymeric film sheet. As noted, the full benefit of using the non-curling, non-contaminating release liner carrier web is realized when the face sheet of the printed film is adhesively laminated to the release liner 10.

The release carrier web or base stock is produced through a simple but unique multi-step line process. The paper substrate is coated through techniques such as extrusion coating with a polypropylene type material as described above. Further down the line, a protective sealing coating formulation, such as an acrylic latex polymer resin is applied as a liquid onto the uncoated underside of the paper and then dried. In this fashion, the unique release liner carrier web or base stock is formed.

The release liner carrier web is then coated on its upper polypropylene side with a silicone or the like type release agent. To this release agent there is applied a transfer adhesive which adheres lightly to the silicone release agent layer.

The printed film or label is then applied to the transfer adhesive and the entire sandwich composite is formed. The printed film or label is then removed and the adhesive transfer material remains with the printed film or label so that application to a glass bottle or the like can be accomplished.

Although the invention has been described by reference to the specific embodiments, the invention is not limited thereto and variations of the product of the embodiments are contemplated. For example, the release liner may be constructed by adding additional coating materials between the acrylic latex polymer coating layer and the substrate. The scope of the invention is limited only by the breadth of the appended claims.

What is claimed is:

1. A release liner comprising:
   (a) a paper substrate having a front side and a back side;
   (b) a polypropylene coating layer located on said front side of said paper substrate;
   (c) a silicone coating layer located on said polypropylene coating layer; and
   (d) a protective sealant layer selected from the group consisting of an acrylic resin, polyvinylidene dichloride and polyvinyl alcohol located on said back side of said paper substrate.

* * * * *